United States Patent
Dulin

(10) Patent No.: US 6,644,345 B2
(45) Date of Patent: Nov. 11, 2003

(54) FLOW CONTROL VALVE

(75) Inventor: Robert Dulin, Kingsbury, TX (US)

(73) Assignee: Research By Copperhead Hill, Inc., Kingsbury, TX (US)

( * ) Notice: Subject to any disclaimer, the term of this patent is extended or adjusted under 35 U.S.C. 154(b) by 0 days.

(21) Appl. No.: 10/177,139

(22) Filed: Jun. 24, 2002

(65) Prior Publication Data

US 2003/0041902 A1 Mar. 6, 2003

Related U.S. Application Data

(63) Continuation of application No. 09/682,435, filed on Aug. 31, 2001, now Pat. No. 6,408,870.

(51) Int. Cl.[7] .................................................. F16K 21/06
(52) U.S. Cl. ........................... 137/462; 137/544; 251/16
(58) Field of Search ................................. 137/456, 462, 137/544; 251/15, 16

(56) References Cited

U.S. PATENT DOCUMENTS

| | | | | |
|---|---|---|---|---|
| 3,561,471 A | * | 2/1971 | Sands | 137/498 |
| 3,735,777 A | * | 5/1973 | Katzer et al. | 137/514.5 |
| 3,752,182 A | * | 8/1973 | Brand | 137/504 |
| 3,779,273 A | * | 12/1973 | Stone et al. | 137/460 |
| 3,850,199 A | * | 11/1974 | Stone et al. | 137/624.11 |
| 3,861,415 A | * | 1/1975 | Larsen | 137/513.5 |
| 4,830,046 A | * | 5/1989 | Holt | 137/460 |
| 5,411,050 A | * | 5/1995 | Saville | 137/101 |
| 5,634,489 A | * | 6/1997 | Tschauner | 137/493.6 |
| 5,755,259 A | * | 5/1998 | Schulze et al. | 137/460 |
| 6,003,550 A | * | 12/1999 | Saarem et al. | 137/614.17 |
| 6,019,115 A | * | 2/2000 | Sanders | 137/10 |
| 6,053,192 A | * | 4/2000 | Ellzey | 137/12 |

* cited by examiner

Primary Examiner—Stephen M. Hepperle
(74) Attorney, Agent, or Firm—David LeCroy

(57) ABSTRACT

A flow control valve is disclosed having a cylindrical housing having inlet and outlet ends and a central portion there between; a piston slidably disposed within the central portion and having a wall at one end thereof; a piston rod having a base and a top, a filter located within the rod, and a spring surrounding the rod for urging the rod and the piston toward the inlet end; and a flow restrictor through which the rod is able to pass. The flow restrictor has a first portion with one or more inlet ports and a second portion separated from the first portion by an annular ridge.

8 Claims, 4 Drawing Sheets

FLOW CONTROL VALVE

CROSS REFERENCE TO RELATED APPLICATIONS

The present application is a continuation of Ser. No. 09/682,435, filed Aug. 31, 2001 now U.S. Pat. No. 6,408,870, issued Jun. 25, 2002.

BACKGROUND OF THE INVENTION

1. Technical Field

The present invention relates to valves. More specifically, this invention relates to an automatic shut-off valve which is responsive to the flow of fluid through the valve when such flow is low.

2. Background Information

Unintentional or accidental discharges are a well known problem with all pressurized fluid distribution systems. Today's consumers who make use of water delivery systems for both domestic and industrial purposes are well aware of the problems of forgotten faucets, broken pipes, property damage and the resultant high water bills.

One means for solving such problems is by automatically interrupting flow at the source after a predetermined volume of flow has occurred. Various techniques are available for providing such interruption, each with their own advantages and disadvantages. For example, an electronic flow meter may be placed in the line whereby a signal is sent to a totalizing computer, which in turn sends a signal to an electric valve in the flow line interrupting flow. While such a solution may be satisfactory for industrial use, it is cost-prohibitive for domestic purposes. Another example involves placing a turbine or nutating disk in the flow line whereby flow is converted into rotary motion, driving a clockwork mechanism that closes a valve after a certain number of revolutions. A third example for interrupting flow is a valve having a plug that is forced against a seat by fluid flow. The seating of the plug is delayed by a dashpot movement retarder, thereby allowing a volume of liquid to pass before seating and stopping flow.

While the first two methods work, the expense of the first and the reliability of the second limit their widespread usage. The third technique is widely known in the art. Many different methods of providing a metered flow into or out of the dashpot are taught. An issue that must be addressed with such a method or valve is reset, i.e., emptying and refilling the dashpot and unseating the plug in preparation for another cycle.

In metering dashpot flow, two conditions are needed—(1) a predicable and constant pressure gradient related to the flow through the valve, and (2) a flow path restrictor in series communicating this pressure gradient to the dashpot, thereby slowing flow and producing a desired time delay effect. In resetting the mechanism, it is common to use a spring that is gradually compressed as timing progresses, providing stored energy to effect reset when called for. The problem with this technique is that as the spring compresses it exerts more and more force, thereby impeding the movement of the timing mechanism, which itself is moved by the constant pressure gradient. Accordingly, there is a need for a valve that provides for an immediate compression of the spring when flow begins so that movement of the cup shaped plug is unaffected.

Further, the dashpot type valve is generally designed for the low end of a predetermined range of flow. In that low volume of flow, it is difficult for the dashpot type valve to provide the minimum pressure gradient necessary for operation. Accordingly, there is a need for a valve wherein the device used to compress the spring also forms a pressure regulator thereby guaranteeing the proper pressure gradient, even at very low flow rates.

SUMMARY OF THE INVENTION

The present invention disclosed herein alleviates the drawbacks described above with respect to responding to fluid flow through a valve, particularly low fluid flow. The valve of the present invention is easily installed in a flow line. It allows the control of the flow of the volume of liquid to be unattended. The range of flow through the valve is wide, ranging from a nominal trickle to full flow.

The valve of the present invention is in one embodiment an automatic reset valve for controlling a volume of flow. The valve has a timing cup for effecting turnoff of flow through the valve; a piston able to be lifted by the flow of the fluid thereby allowing the fluid to flow through the valve; and a regulator in communication with the piston and having one or more ports through which flow from an inlet of the valve is able to flow through to an outlet of the valve.

As designed, the valve of the present invention is easily and conveniently installed in a flow line. Its simple design allows it to be inexpensively manufactured. It may be manufactured in a wide range of sizes, based upon the size of the flow line to be served. By proper selection of materials, the present invention may be used for controlling a wide variety of flow.

The invention permits the unattended control of the volume of flow there through. By controlling the volume of flow, water waste and flood damage from forgotten or broken lines are minimized or even eliminated. The valve of the present invention provides for an automatic reset should the flow volume during one event not exceed its predetermined limit. Likewise, the valve of the present invention provides for an automatic reset once pressure is equalized after a turnoff event, such as turning off the flow supply or a fixture valve.

The valve of the present invention is comprised of at least two components that enable it to overcome those limitations that are encountered with typical dashpot type valves. These components include a timing cup for containing a predetermined, preferred volume of fluid, and a regulator integral with the valve, rather than separate from it yet in communication with it, for controlling the total volume of flow through the valve.

As disclosed herein, the timing cup provides a preferred means of containing a variable volume of fluid. Other means that would likewise serve the same function include a bellows or a diaphragm. Such containers contain a predetermined volume of fluid based upon its stroke length and diameter required for movement of the container to occur at a constant pressure. The container further provides a means of effecting turnoff of flow through the valve.

The regulator provides a stable fixed base that other components of the valve react against. It has one or more ports that provide communication between the inlet and outlet for fluid flow. By covering these ports, flow through the valve is effectively turned off.

The general beneficial effects described above apply generally to each of the exemplary descriptions and characterizations of the devices and mechanisms disclosed herein. The specific structures through which these benefits are delivered will be described in detail herein below.

DETAILED DESCRIPTION OF THE INVENTION

Figure 1:
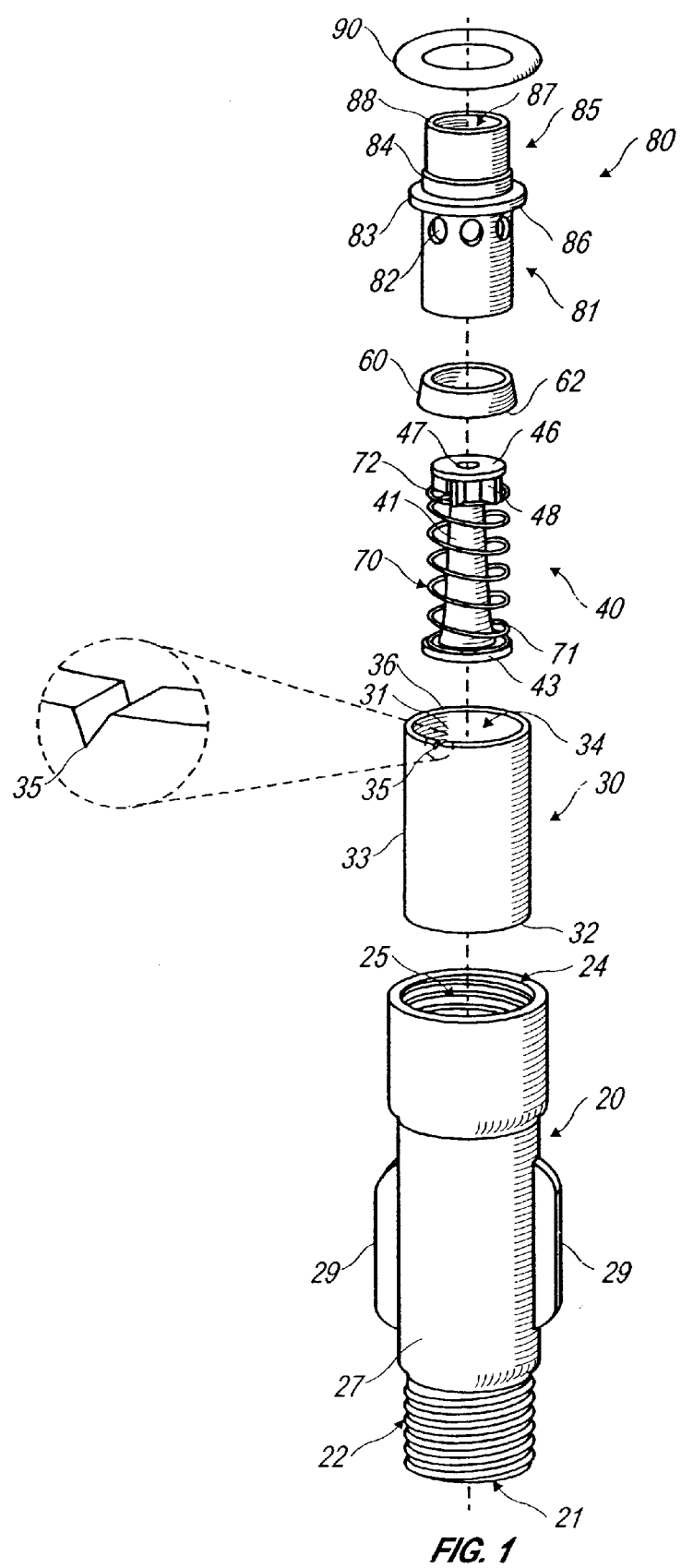
FIG. 1 is an exploded perspective view of a flow control valve according to the present invention.

As required, detailed embodiments of the present invention are disclosed herein. However, it is to be understood that the disclosed embodiments are merely exemplary of the invention that may be embodied in various and alternative forms. The figures are not necessarily to scale, and some features may be exaggerated or minimized to show details of particular components. Therefore, specific structural and functional details disclosed herein are not to be interpreted as limiting, but merely as a basis for the claims and as a representative basis for teaching one skilled in the art to variously employ the present invention.

Referring to the drawings, the shut-off valve of the present invention is indicated generally at 10. The valve has an inlet end 21 and an outlet end 24 that are connected to inlet and outlet flow lines (not shown). The valve 10 is adapted to receive a variable fluid flow at its inlet end 21 and automatically limit to a predetermined quantity the amount that flows through the valve to the outlet end 24.

The valve 10 is comprised of a hollow cylindrical housing 20, a movable timing cup 30, a shuttle piston 40, a biasing member such as a coil reset spring 70, and a regulator 80, all of which are disposed between the inlet 21 and the outlet 24 of the housing 20. Each of these elements will be described more fully hereinafter.

The housing 10 is tapped at both ends to provide threads 22 and 25 at the valve inlet 21 and outlet 24, respectively. While the drawings illustrate an externally threaded inlet end 21 and an internally threaded outlet end 24, it should be understood that both ends may be either internally or externally threaded. Likewise, other means readily apparent to one skilled the art may be used to provide a leak-proof joint, such as a flange, clamp or glue. The area of the housing 10 between the tapped ends, defined as the central portion 27, has a smooth central internal surface or bore 28 adapted to slidably receive the timing cup 30 therein. Formed in the central portion 27 proximate to the inlet 21 and circumferential therewith is an inlet annular seat or timing cup stop 23 for communicating with the cup 30, thereby limiting its travel to reset. Also formed in the central portion 27 proximate to the outlet 24 and circumferential therewith is an outlet annular seat 26 for communicating with the regulator 80. The diameter of the inlet seat 23 is smaller than that of the central portion 27, whereas the diameter of the outlet seat 26 is greater than that of the central portion 27. The purpose of the inlet seat 23 and the outlet seat 26 will be described below. The exterior of the central portion 27 may optionally have one or more projecting handles or grip fins 29 that function in providing leverage in connecting the valve 10 with the inlet and outlet flow lines. In other embodiments, the central portion 27 exterior itself may be designed in such a manner that the central portion 27 provides the leverage.

Slidably disposed within the housing central portion 27 is the hollow cylindrical timing cup 30, comprised of an internal bore 31, preferably of constant diameter throughout, and a cup base 32 placed proximate to the inlet end 21 of the housing 20. The cup base 32 is integral with and covers the end of the cup 30. The external diameter 33 of the cup 30, while large enough that the circumference of the cup 30 is nearly adjacent to the central bore 28, is still small enough that flow through the valve 10 can occur between the central surface 28 and the external diameter 33. The inlet seat or timing cup stop 23 should be of such diameter as to prevent the timing cup 30 from extending into the inlet 21, effectively acting as an annular stop or seat for the cup 30. In one embodiment, the valve 10 may be equipped with a volume modifier (not shown) for regulating a preset volume of fluid contained within the cup 30, thereby effectively modifying the output volume. Such modifiers may include a hollow threaded movable stop that effectively moves up or down the cup stop 23, one or more washes, etc. By modifying the output, it is to be understood that the total volume to shutoff may be thus varied over a range of values. This provides an advantage for modification of output volume in the field. In an optional embodiment, the cup 30 may have a pressure equalizer notch or bleed 35 on the cup rim 36 for regulating pressure within the cup 30. Effectively, the bleed 35 functions in equalizing pressure between the inlet 21 and outlet 24 ends thereby allowing an automatic reset of the cup 30 once flow is stopped through the valve 10.

Removably disposed within the bore 31 of the cup 30 is the shuttle piston 40, having a substantially flat circular base 43 with a centrally disposed base aperture 44 formed axially there through. The external diameter of the base 43 is of such size that it is able to freely move along the length of the timing cup internal bore 31. Opposite the side of the piston base 43 most adjacent to the cup base 32 is an annular collar 45 projecting normally from there. The collar 45 is spaced inwardly from the periphery of the piston base 43 in order to provide a seat for the spring 70, enabling it to be centered thereabout. Integral with the base 43 and projecting from there towards the outlet 24 of the housing 20 is a hollow central stem 41, cylindrical or conical in shape. Preferably, at least a portion of the stem 41 is conical in shape, thereby providing a cup seal seat 50. In another embodiment, the cup seal seat 50 may represent a portion of the stem 41 that is wider in diameter than the other portion of the stem 41. The function of the cup seal seat 50 will be described hereinafter. At that end of the stem 41 most distal from the base 43 is the piston top 46. The top 46 is integral with the stem 41 and has a centrally disposed top aperture 47 formed axially there through. The diameter of the top 46 is substantially the same or smaller in diameter than the base 43.

In another embodiment not illustrated, an annular groove may be created around the piston top 46 and a piston ring installed therein. In doing so, the range of fluid flow through the piston may be reduced to nearly zero.

Figure 5:
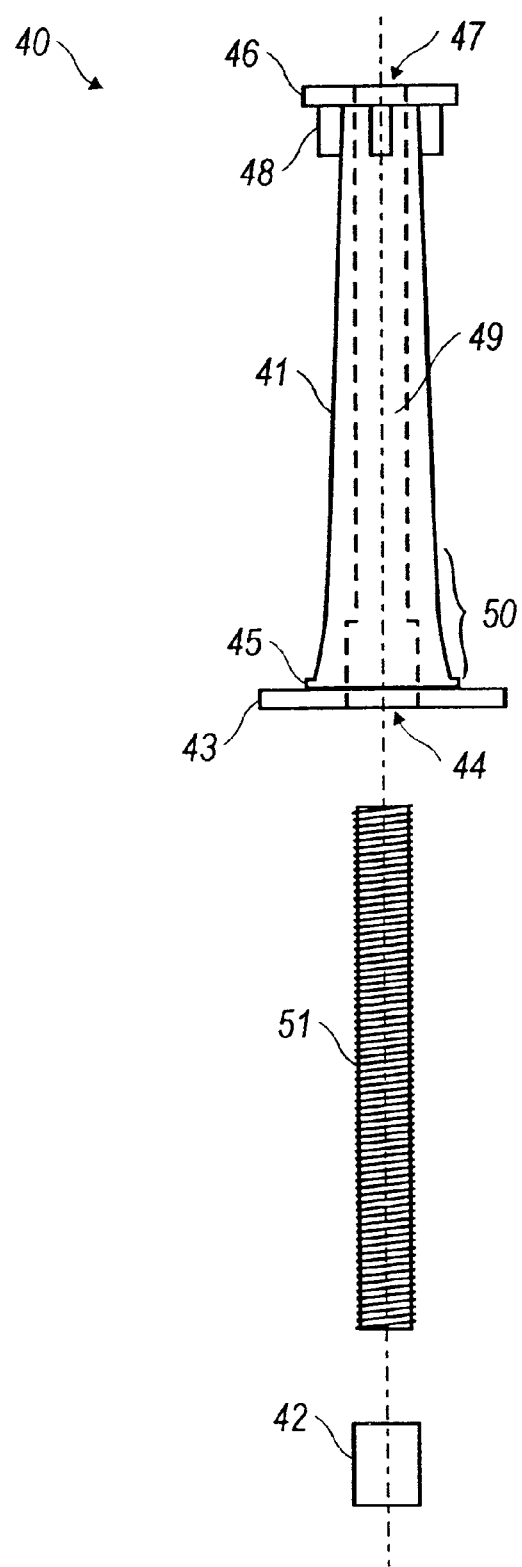
FIG. 5 is an exploded perspective of one embodiment of the shuttle piston of a flow control valve according to the present invention.
Figure 6:
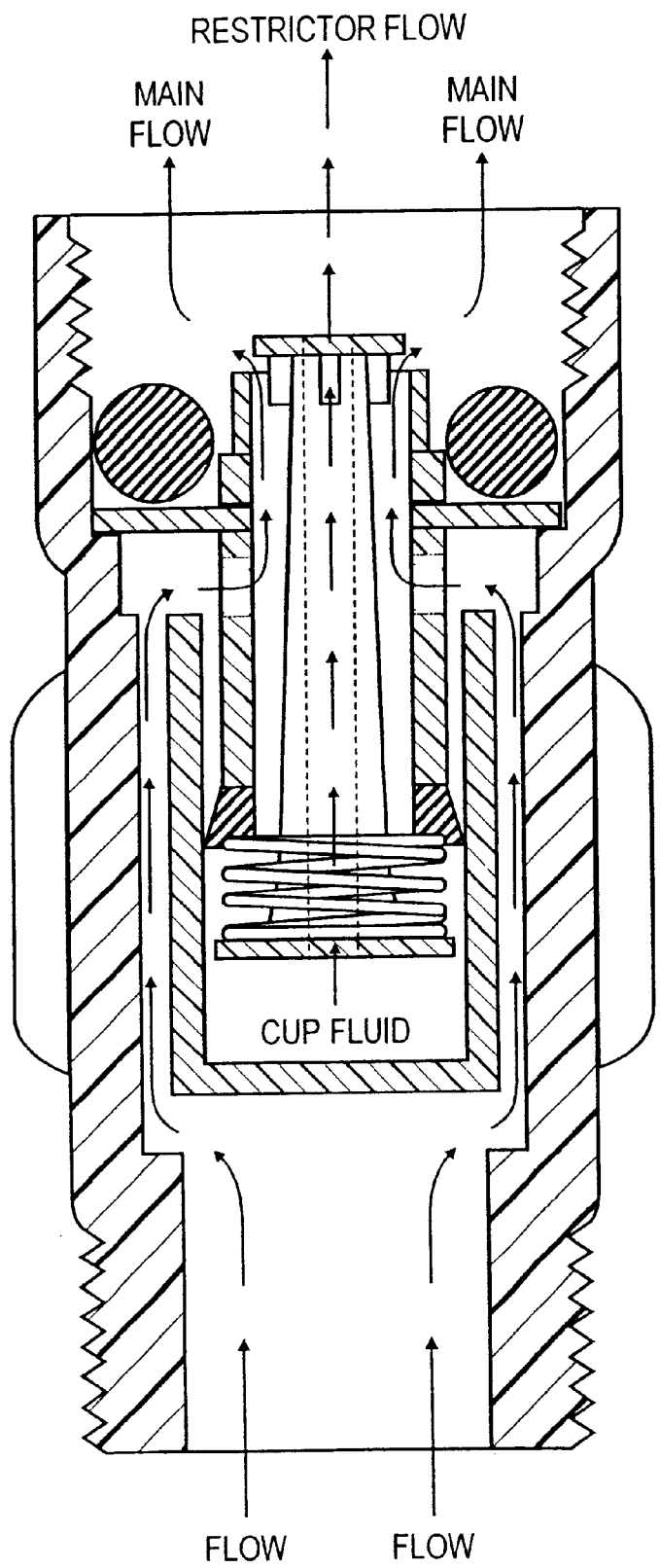
FIG. 6 is a longitudinal cross-sectional view of a flow control valve according to the present invention showing the direction of flow through the valve during the timing stage of flow.

Centrally located along the interior axis of the stem 41 is a piston passage 49. The passage 49 begins at the base aperture 44 and continues along the center of the stem 41 to the top aperture 47. The passage 49 preferably has some type of flow restrictor therein for regulation of flow rate out of the timing cup 30. In one embodiment, the restrictor may be a filter type material placed throughout the length of the passage 49. The passage 49 and filter may vary in diameter and density, calibrated to a desired flow rate proportional to the pressure drop from the base 43 to the top 46 of the piston 40. In another embodiment, illustrated in FIG. 5, the passage 49 may utilize the combination of both a filter 42 and tortuous threaded path or timing flow restrictor 51. The length and threads of the flow restrictor 51 may be designed and calibrated to provide, similar to the filter in the previous embodiment, a desired flow rate proportional to the pressure drop from the base 43 to the top 46 of the piston 40. In the embodiment illustrated in FIG. 5, the filter 42 aids in preventing debris from entering into the passage 49 preventing flow. Other embodiments for restricting the flow through the passage 49 would be recognized by one skilled in the art.

While not a necessary part of the piston 40, there may be projecting away from the top 46, integral with the stem 41, one or more axial ridges 48. The ridge 48 preferably extends outwardly toward the edge of the top 46. The ridge 48 provides support for the piston 40 and a seat for the timing cup seal or piston gasket 60, and further centers the piston 40 within the regulator internal bore 87. Further, the ridge 48 permits the top 46 to slidably extend slightly beyond the end of the regulator 80 while remaining centered within the regulator 80. For that embodiment wherein no ridge 48 is provided, the top 46 will act as the seat for the timing cup seal 60 and aid in centering the piston 40.

The timing cup seal 60 is disposed concentrically about the external portion of the stem 41 and able to move freely along its length. The cup seal 60 is of such size as to provide a substantially flow-proof seal between the internal bore 31 of the cup 30 and the bottom of the regulator 80. However, the interior diameter of the cup seal 60 is of such size that flow is able to occur between the seal 60 and the central stem 41, through the spring 70 and down to the base 44, thereby allowing the cup 30 to refill during reset. When the spring 70 is compressed and the seal 60 seated at the cup seal seat 50, the interior diameter of the cup seal 60 is such that no flow occurs between the seal 60 and the seal seat 50. On that side of the timing cup seal 60 most distal from the top 46 is an annular timing cup groove 62 for providing a seat for the spring 70, thereby centering the spring 70 within the cup 30 and piston 40. The timing cup groove 62 may be situated anywhere along the diameter of the cup seal 60, but preferably is placed so that the seal 60 is able to seat over the end of the spring 70.

The helical coil spring 70 is disposed substantially concentrically about the central stem 41 with its one end 71 abutting one side of the base 43 and its other end 72 seated in the cup seal 60, nearly adjacent to either the top 46 or that end of the ridge 48 most distal from the top 46. When relaxed and extended, the spring 70 extends substantially the length of the stem 41, thereby maintaining the base 43 in a substantially concentric position relative to the internal bore 31, providing relative uniform contact between the piston base 43 and the cup base 32, and biasing the piston 30 towards the inlet 21. The tension of the spring 70 may vary depending upon the speed and volume of flow desired to be regulated.

Disposed against the cup seal 60 is the regulator 80, having an external diameter slightly less than the timing cup internal bore 31 and being slidably disposed therein. The regulator 80 is cylindrical in form with a regulator internal bore 87 throughout. The regulator bore 87 is of uniform diameter whereby it is able to slidably receive the piston top 46. The regulator 80 is further comprised of a first portion 81 and a second portion 85 separated by a central annular ridge 83 projecting outwardly from there. The first and second portions 81, 85 may or may not have the same external diameter. However, the first portion 81 should be of such diameter that it can be slidably received within the internal bore 31 of the timing cup 30. The second portion 85 should be of such diameter that a flow conduit can threadably engage with the outlet 24 in that instance wherein the internal portion of the outlet 24 is tapped. Further, the first portion 81 may have one or more inlet ports 82 proximate to the central ridge 83 for permitting flow through there. The number and size of the ports 82 may be based upon the desired flow rate.

Placed within the outlet 24 of the housing 20 above the central ridge 83 of the regulator 80 and below the outlet threads 25 of the housing 20 is an outlet gasket 90, preferably an o-ring type seal. This gasket 90 provides a seal between the central portion 27 and the outlet 24 of the valve 10. The gasket 90 should be of such diameter that it does not exceed the outermost diameter of the central ridge 83. Along the outer diameter of the second portion 85 of the regulator 80 is a chamfer or gasket seat 84 that aids in seating the gasket 90 between the second portion 85 of the regulator 80 and the interior of the outlet 24. In an optional embodiment, the outlet 24 may have an additional gasket seat (not illustrated) between the outlet seat 26 and the outlet threads 25 for providing further support in seating the outlet gasket 90, thereby improving the seal between the outlet 24 and the regulator 80.

Figure 3:
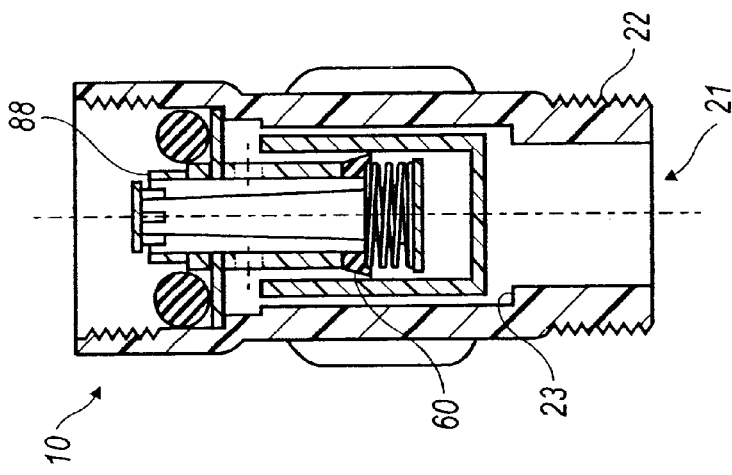
FIG. 3 is a longitudinal cross-sectional view of a flow control valve according to the present invention showing the position of the piston with flow through the valve.

Referring again to the Figures, particularly FIGS. 2–4 and 6, the operation of the valve is as follows: When no flow is occurring through the valve, the components of the valve 10 are in that position illustrated in FIG. 2. There it is shown the spring 70 fully extended, the base 32 of the cup 30 adjacent to the inlet seat 23, the port(s) 82 of the regulator 80 above the end of the cup 30 and the piston base 43 adjacent to the internal portion of the cup base 32. As fluid flow begins, the piston 40 is lifted, compressing the spring 70 as illustrated in FIG. 3. The cup 30 is gradually lifted, allowing flow to continue through the central portion 27 of the valve 10 between the central bore 28 and the cup external diameter 33, over the cup rim 36, through the regulator port(s) 82, and up between the stem 41 and regulator internal bore 87 over the regulator rim 88 and out the valve 10. The flow rate through the valve 10 is not critical. In fact, a unique feature of the present invention is that even an extremely low flow rate will be sufficient to lift the piston top 46 above the regulator rim 88. Understandably, the less the flow rate, the less the piston top 46 is lifted above the regulator rim 88.

It should be understood that, due to the proximity of the piston top 46 and the regulator internal bore 87, a pressure differential is created between the piston base 43 and top 46. The area around the base 43 is one of higher pressure than that area around the top 46. This pressure differential results in the piston 40 being pulled or lifted to the area of lower pressure rather than pushed, creating the outlet between the regulator rim 88 and the piston top 46 wherein fluid can escape. Once the piston 40 is up, the cup seal seat 50 seals that area between the piston 50 and the cup seal 60.

The only way for liquid contained in the timing cup 30 to escape is through the piston passage 49 to the area of lower pressure above the top aperture 47. This escape is limited by the type of restrictor 51 placed in the piston passage 49 as indicated above. Further, the escape of liquid from the cup 30 creates a type of hydraulic lock wherein the cup 30 is limited in its upward motion.

Figure 4:
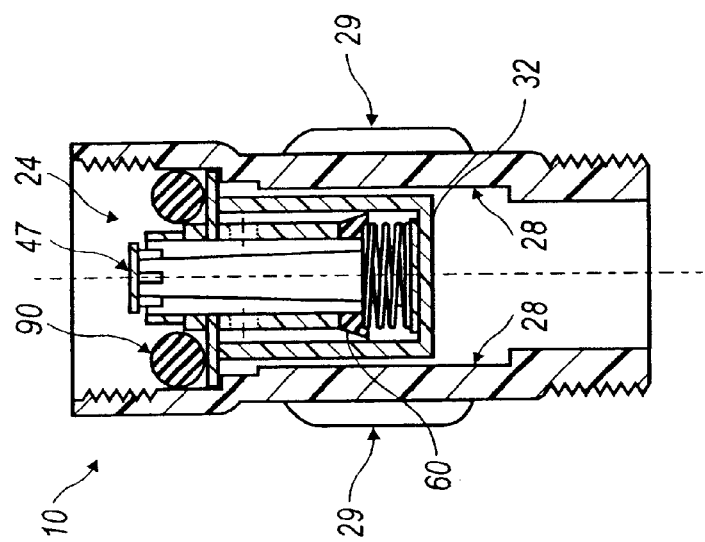
FIG. 4 is a longitudinal cross-sectional view of a flow control valve according to the present invention showing the position of the timing cup over the inlet port(s) of the regulator stopping flow through the valve.

Drag due to the flow between the cup external wall 33 and the central bore 28 urges the cup 30 up as the hydraulic lock is relieved by flow through the restrictor 51. This upward movement of the cup 30 continues until its rim 36 comes in contact with, or nearly in contact with, the central ridge 83, covering the port(s) 82 and blocking flow out the valve 10. Flow through the valve 10 has now stopped, as illustrated in FIG. 4. A condition of higher pressure at the inlet 21 and lower pressure at the outlet 24 exists. This pressure differential causes the cup 30 to remain seated with its rim 36 against the seat 86, allowing no flow except that predetermined by the bleed 35. The cup base 32 is in contact with the piston base 43, holding the piston 40 up and keeping the spring 70 compressed. Once in this no flow position, the cup 30 stops reverse flow, effectively preventing any backflow that may occur.

It is possible, by making the clearance between the timing cup external wall 33 and the central bore 28 large, to minimize drag against the cup 30. As such, drag is no longer a factor. The valve 10 is still functional due to the lower pressure transmitted to the cup bore 31.

Figure 2:
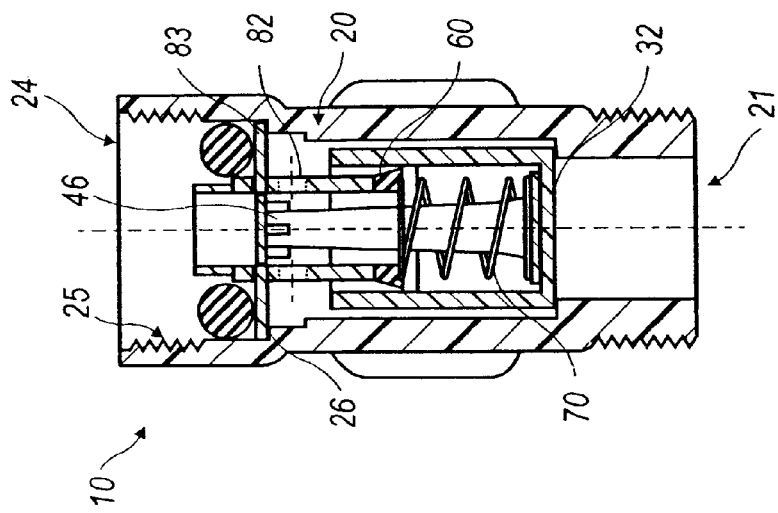
FIG. 2 is a longitudinal cross-sectional view of a flow control valve according to the present invention showing the position of the piston with no flow through the valve.

By equalizing the pressure differential between the inlet 21 and the outlet 24, the valve 10 will reset, with the spring 70 pushing the piston 40 and cup 30 back to their starting position as illustrated in FIG. 2 wherein the cup base 32 is resting on the cup stop 23. Pressure equalization may occur, for example, by closing a valve on the inlet flow line thereby allowing pressure to dissipate through the bleed 35, or closing a valve on the outlet flow line thereby allowing the outlet side to repressurize through the bleed 35. Other means for equalizing pressure and thereby effecting reset will be readily apparent to one skilled in the art. Such means may include, for example, providing a "dump" line with a valve at the end thereof and between an inlet supply valve and the flow valve 10, whereby the higher inlet pressure is opened to atmosphere by opening the dump valve after closing the supply valve. In another means, the dump line may be connected to both the inlet line and outlet line between the supply valve and flow valve on the inlet side, and between the flow valve and a fixture valve on the outlet side. By turning off either the supply valve or fixture valve, the dump valve may then be opened thereby allowing pressure to equalize between the higher pressure inlet side and the lower pressure outlet side. Further, a sealed push button may be provided on the side of the housing 20. By pushing the button after turning off the supply or fixture valve, the cup may be unseated thereby allowing the system to be equalized. Additionally, the push button may be designed so that it unseats a check valve in the flange or ridge 83 of the regulator 80.

It should be further recognized that, by choice of spring pressure or tension, restrictor capacity, and clearance between the piston top and regulator bore, the valve 10 may function as a time controlled device, as opposed to or in addition to a total volume device. For example, one valve 10 may be designed to turn off in thirty (30) minutes. The valve 10 may allow a flow rate of 0.2 gallons per minute ("GPM"), releasing six (6) gallons before turning off. By changing the flow rate in the same valve 10 to ten (10) GPM, the valve still turns off in 30 minutes, but after releasing 300 gallons of fluid.

Although the present invention has been described and illustrated in detail, it is to be clearly understood that the same is by way of illustration and example only, and is not to be taken as a limitation. The spirit and scope of the present invention are to be limited only by the terms of any claims presented hereafter.

Industrial Applicability. The present invention finds applicability in the valve industry, and more specifically in automatic shut-off valves. Of particular importance is the invention's ability to stop water waste and damage caused by running toilets, forgotten sinks and broken pipes.

What is claimed and desired to be secured by Letters Patent is:

1. A flow control valve comprising:

a housing having an inlet end adapted for receiving a fluid flow, an outlet end adapted for outputting the fluid flow and a central portion there between;

a displaceable timing cup residing within the central portion;

a piston having a base, a top, and a stem there between, the stem having a passage from the base to the top;

a biasing member disposed around the stem of the piston and adapted to bias the piston toward the inlet end in response to the outlet end receiving fluid flow, wherein the biasing member is substantially immediately compressed when flow begins, thereby enabling movement of the timing cup to be unaffected; and a regulator having a first portion with at least one inlet port adapted for outputting fluid flow passing through the central portion of the housing, a second portion, and a ridge separating the first portion from the second portion.

2. The flow control valve of claim 1 wherein the timing cup is able to effect turnoff of flow through the valve.

3. The flow control valve of claim 2 wherein the valve is adapted to receive a variable fluid flow at the inlet end and substantially automatically limit the amount that flows through the valve to the outlet end to a predetermined quantity.

4. The flow control valve of claim 4 wherein the housing further comprises a timing cup annular seat for communicating with the cup, thereby limiting the travel of the cup.

5. The flow control valve of claim 2 wherein the housing further comprises a regulator annular seat for communicating with the regulator.

6. The flow control valve of claim 2 wherein the stem passage is further comprised of a flow restrictor, wherein flow out of the timing cup is regulated.

7. The flow control valve of claim 2 wherein the tension of the biasing member is selected based upon the speed and volume desired to be regulated.

8. The flow control valve of claim 2 further comprising a timing cup seal concentrically displaceable about the piston stem.

\* \* \* \* \*